United States Patent

[11] 3,597,834

[72] Inventors Jay W. Lathrop
Dallas;
Robert S. Clark, Dallas; Sam J. Wood, Jr.,
Richardson, all of, Tex.

[21] Appl. No. 705,502
[22] Filed Feb. 14, 1968
[45] Patented Aug. 10, 1971
[73] Assignee Texas Instruments Incorporated
Dallas, Tex.

[54] METHOD IN FORMING ELECTRICALLY CONTINUOUS CIRCUIT THROUGH INSULATING LAYER
6 Claims, 9 Drawing Figs.

[52] U.S. Cl. ........ 29/576 R, 29/575 R, 29/577 R, 29/588 R, 29/591 R, 29/625 R, 29/628 R, 117/212 R, 117/113 R, 317/101 A, 317/234, 174/68.5

[51] Int. Cl. ........ B41m 3/08, B01j 17/00

[50] Field of Search ........ 29/588, 589, 625, 626; 317/101 A, 234; 117/212, 113

[56] References Cited

UNITED STATES PATENTS

| | | | |
|---|---|---|---|
| 3,287,612 | 11/1966 | Lepselter | 29/577 UX |
| 3,383,568 | 5/1968 | Cunningham | 29/578 UX |
| 3,419,765 | 12/1968 | Clark et al. | 317/101 (A) UX |
| 3,495,324 | 2/1970 | Guthrie et al. | 29/589 X |
| 2,890,395 | 6/1959 | Lathrop et al. | 29/626 UX |
| 3,138,744 | 6/1964 | Kilby | 29/626 UX |
| 3,169,892 | 2/1965 | Lemelson | 29/625 UX |
| 3,264,402 | 8/1966 | Shaheen et al. | 29/625 X |
| 3,312,871 | 4/1967 | Seki et al. | 317/101 CX UX |
| 3,319,317 | 5/1967 | Roche et al. | 29/625 |

*Primary Examiner*—John F. Campbell
*Assistant Examiner*—Robert W. Church
*Attorneys*—Samuel M. Mims, Jr., James O. Dixon, Andrew M. Hassell, Harold Levine, Melvin Sharp, James C. Fails, Gerald B. Epstein and John E. Vandigriff

ABSTRACT: This specification discloses an improvement in forming an electrically continuous circuit in which one metal conductor is connected with another metal conductor through an aperture in an insulating layer therebetween. The improvement is characterized by electrolessly depositing a metal conductor in and through the aperture to effect electrical connection with the first metal conductors and electrically connecting the second layer metal conductor therewith. Thus, good electrical continuity is effected regardless of the configuration of the sidewalls of the aperture.

Patented Aug. 10, 1971 3,597,834

4 Sheets-Sheet 1

INVENTORS
JAY W. LATHROP
ROBERT S. CLARK
JAMES A. CUNNINGHAM
SAM J. WOOD, JR.
BY
James C. Fails
ATTORNEY Patented Aug. 10, 1971 3,597,834

4 Sheets-Sheet 3

METHOD IN FORMING ELECTRICALLY CONTINUOUS CIRCUIT THROUGH INSULATING LAYER

BACKGROUND OF THE INVENTION

1. Field of the Invention

The invention relates to an electrical circuit, and more particularly to multilevel semiconductor integrated circuit arrays in which alternate layers of films of metal and electrical insulating material are employed to form multilevel lead and interconnection patterns.

2. Description of the Prior Art

In the days of hand wired chassis for electrical components there was a relatively low density of components per unit volume of space. Today, however, the increased demand for miniaturization has been reflected in the field of electronics by the development of semiconductor integrated circuits, or intricate circuit networks, having a high density of components on a single plane. For example, in integrated circuits, a plurality of active and passive circuit components are frequently formed on a single slice of semiconductor material. Each of the circuit components must thereafter be interconnected in a particular manner to form the desired circuit function. For example, an integrated circuit device of the monolithic type may have a number of components such as transistors, and resistors formed at one major face of a wafer of semiconductor material such as silicon. Thereafter an insulating layer, ordinarily silicon oxide, is formed upon the face of the wafer. Apertures are cut through the insulating layer and ohmic contacts affixed to selected regions of the components. These ohmic contacts are then connected to one or both of other ohmic contacts or metal terminal pads on the wafter. Ordinarily, metallic films are formed upon the oxide layer to interconnect the resistors and the various regions of the transistors in a desired pattern through apertures in this insulating layer. With increasingly intricate and miniaturized circuits, however, the correspondingly large number and complexity of terminal pads and interconnection patterns make necessary the use of more than one level of metallic film interconnections with adequate electrical isolation between the various levels at the crossover points. This is particularly true when a plurality of separate circuits are formed upon a single slice of semiconductor material and it becomes necessary to interconnect the circuits for cooperative action to produce one unitary function.

It has been found that in ordinary etching operations carried out by conventional photolithographic techniques, the apertures formed in the insulating layer often have bell-shaped cross sections in which a portion of the sidewall is shadowed by the entry port. Expressed otherwise, the sidewalls of the aperture are inversely inclined to the direction necessary for deposition of metal thereon by conventional techniques. Thus, when a second or subsequent metallization layer is laid down by conventional techniques, such as vacuum evaporation techniques, it does not traverse completely the sidewalls of the aperture, resulting in an electrical discontinuity. The high proportion of slices in which this type of electrical discontinuity has effected undesirable results and caused either reworking or discarding the slice has been a major cost barrier.

SUMMARY OF THE INVENTION

It is an object of this invention to prevent electrical discontinuities along the sidewall of an aperture through an insulating layer separating two metal conductors and thus, to insure electrical connection therebetween.

It is a particular object of this invention to effect a much higher proportion of good devices and integrated circuits on slices of semiconductor material in which multilevel interconnection of metal conductors is effected through insulating layers thereover.

In accordance with the invention there is provided an improvement in a method of forming an electric circuit in which a first metal conductor is connected through an aperture in an insulating layer with a second metal conductor. The improvement consists essentially of electrolessly depositing a metal conductor in and through the aperture to effect electrical connection with the first metal conductor, and electrically connecting the second metal conductor with the electrolessly deposited metal conductor through the aperture, whereby good electrical continuity is effected regardless of the configuration of the sidewalls of the aperture.

The improvement of the invention is particularly advantageous when the metal conductor electrolessly deposited through the aperture is deposited to substantially and conformably fill the aperture such that good electrical continuity between the levels of metal conductors is insured.

Expanded Metal Contact

Figure 1:
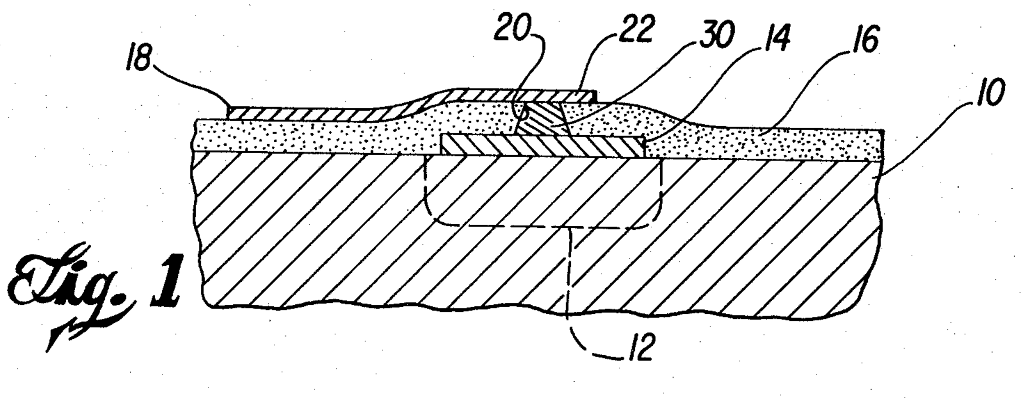
FIG. 1 is a cross-sectional view of one embodiment of the invention.

A specific embodiment which illustrates the invention is shown in FIG. 1. The embodiment is a semiconductor component having an expanded metal contact atop a protective insulating layer. It, as the other embodiments, is described as an illustration of the invention and is not to be construed as a limitation. In FIG. 1, a portion of semiconductor material 10 adjacent a surface of a body has a discrete component 12, shown as a diode, formed therein by any conventional technique, such as by epitaxial growth or by diffusion. Diode 12 has a metal conductor 14 forming an ohmic contact with one side thereof. For one or more reasons the metal conductor 14 is covered by an insulating layer 16. For example, insulating layer 16 may be provided to prevent corrosion or oxidation of the metal conductor 14. It is desirable to connect metal conductor 14 with a metal terminal pad 18 serving as an expanded metal contact to which another part of the electrical circuit can be bonded effectively. Specifically, metal conductor 14 may be molybdenum, which is susceptible to oxidation and corrosion, whereas metal terminal 18 may be gold, which is not. Gold is therefore used to facilitate making subsequent electrical connection therewith; e.g. by ball bonding.

Figure 2:
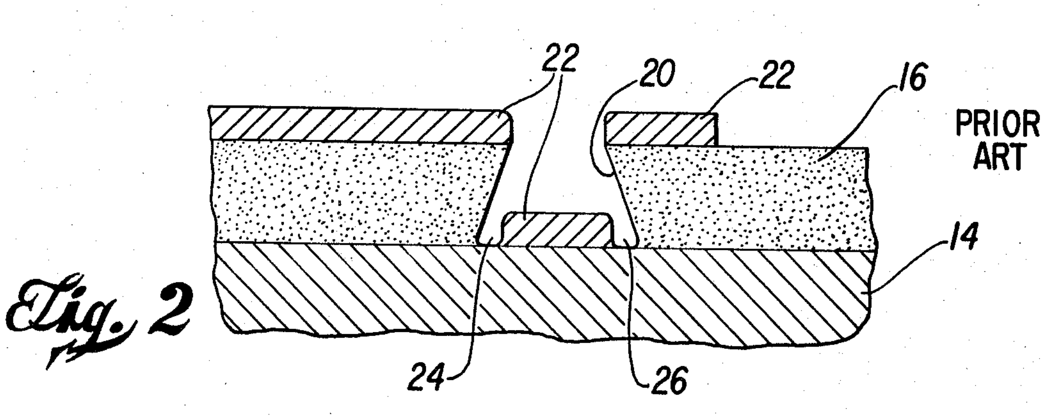
FIG. 2 is an enlarged cross-sectional view of an aperture through an oxide layer and the result effected by prior art process.

To insure electrical continuity between metal conductor 14 and metal terminal pad 18 serving as a second metal conductor, the following procedure is employed. Insulating layer 16 is deposited by conventional low temperature processes such as sputtering. Subsequently, aperture 20 is cut through insulating layer 16 using conventional photolithographic mask and etch techniques. To minimize capacitive coupling being made with semiconductor material 10 by metal terminal pad 18 or metal film 22 when subsequently applied, insulating layer 16 is relatively thick, e.g. greater than one micron in thickness. When aperture 20 is etched through such a relatively thick insulating layer there is a tendency for the etching solution to form a bell-shaped hole such that if the metal forming layer 22 were applied by conventional techniques such as evaporation or sputtering, there would be "shadowing" or electrical discontinuities along the sidewalls of the aperture. "Shadowing" is the phenomena in which overhanging edges of the oxide prevent deposition of metal in all of the void space of the bell-shaped aperture. The effects of shadowing are illustrated in FIG. 2. Therein the metal film 22 is deposited onto insulating layer 16 and through aperture 20. Because of the overhanging lips of aperture 20, the metal 22 is deposited only at the center and at the bottom of the aperture 20 adjacent metal conductor 14, leaving areas 24 and 26, as well as the sidewalls of aperture 20, essentially barren of metal 22.

To prevent the problems associated with shadowing, metal is electrolessly deposited, as described in detail hereinafter, through aperture 20 to metal conductor 14 therebeneath. Consequently metal fill-in 30 is formed which substantially completely and conformably fills aperture 20 insuring electrical continuity through insulating layer 16 to metal conductor 14. Thereafter metal conductor 22 and metal terminal pad 18 are formed by any of the conventional techniques. For example, metal may be deposited by vacuum evaporation and selectively etched away using conventional photolithographic mask and etch techniques. Alternatively, a metallic lead from a preformed terminal pad 18; for example, an extension from a lead frame; may be bonded directly to metal fill-in 30 by conventional bonding techniques such as sonic or solder bonding.

Terminal Pad Interconnection

Figure 3:
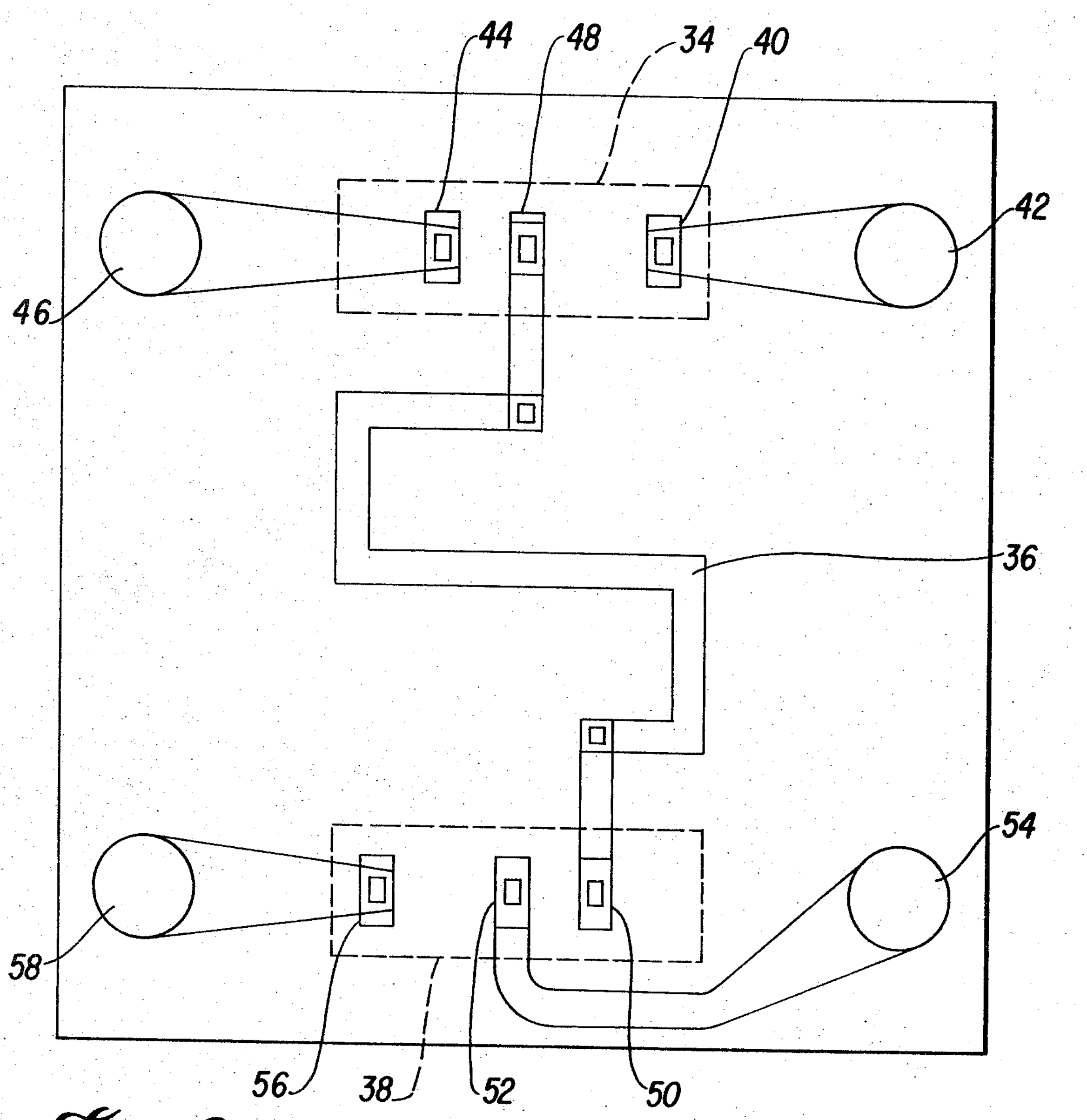
FIG. 3 is a plan view of an illustrative integrated circuit wafer having terminal pads thereon.

Frequently, the semiconductor art presents problems which are more complex than illustrated in FIG. 1. For example, an integrated circuit such as the one illustrated in a plan view in FIG. 3 may form one wafer of several hundred wafers on a semiconductor slice. FIG. 3 shows a transistor 34 connected through a resistor 36 with a second transistor 38. More specifically, the transistor 34 may have its collector 40 connected with a metal terminal pad 42, its base 44 connected with metal terminal pad 46 and its emitter 48 connected with resistor 36. Resistor 36 is in turn connected with base 50 of transistor 38. Transistor 38 has its emitter 52 connected with metal terminal pad 54 and its collector 56 connected with metal terminal pad 58. Thus, the problem which the method of the invention is required to solve is ordinarily, a method of interconnecting the terminal pads of the various integrated circuits into an integrated circuit array that performs a unitary function.

Figure 4:
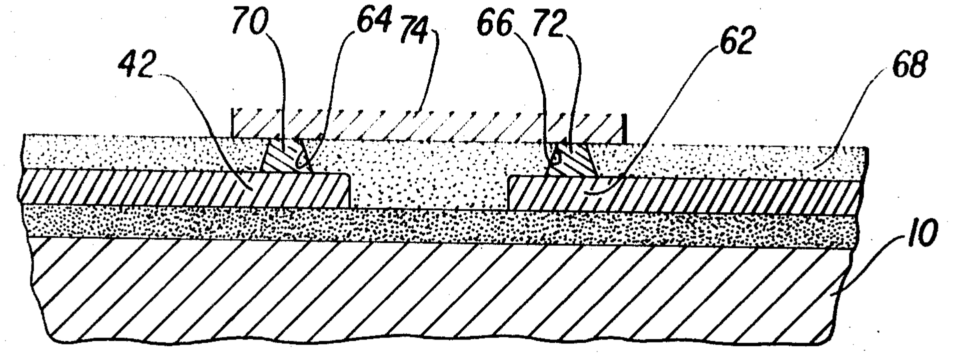
FIG. 4 is a cross-sectional view of one embodiment of the invention wherein terminal pads, illustrated in FIG. 3, of respective integrated circuits are interconnected by a second level metal conductor.

As illustrated in FIG. 4, the interconnection of the respective bonding pads 42 and 62 present essentially the same problems; namely, insuring electrical continuity through apertures 64 and 66 through insulating layer 68. Again the problem is solved by employing the method of the invention and electrolessly depositing a metal to form metal fill-ins 70 and 72 which substantially completely and conformably fill the apertures 64 and 66 and insure electrical continuity regardless of the configuration of the sidewalls of these apertures. Thereafter metal conductor 74 can be formed to interconnect metal fill-ins 70 and 72.

Subsequent levels of interconnection of terminal pads may be employed by depositing subsequent levels of insulating layers, forming apertures through the insulating layers to the selected bonding pads using the conventional photolithographic mask and etch technique, electrolessly depositing metal fill-in and through the apertures thus formed, and forming the metal interconnection between the metal fill-ins electrolessly deposited in the apertures.

Interconnections Generally

Having illustrated the invention by specific embodiments and in broad descriptive terms, the following specific embodiment is described generically as connecting selected regions and interconnecting the metal conductors used therefor, but includes detailed description of the process steps to complete the understanding thereof.

Figure 5:
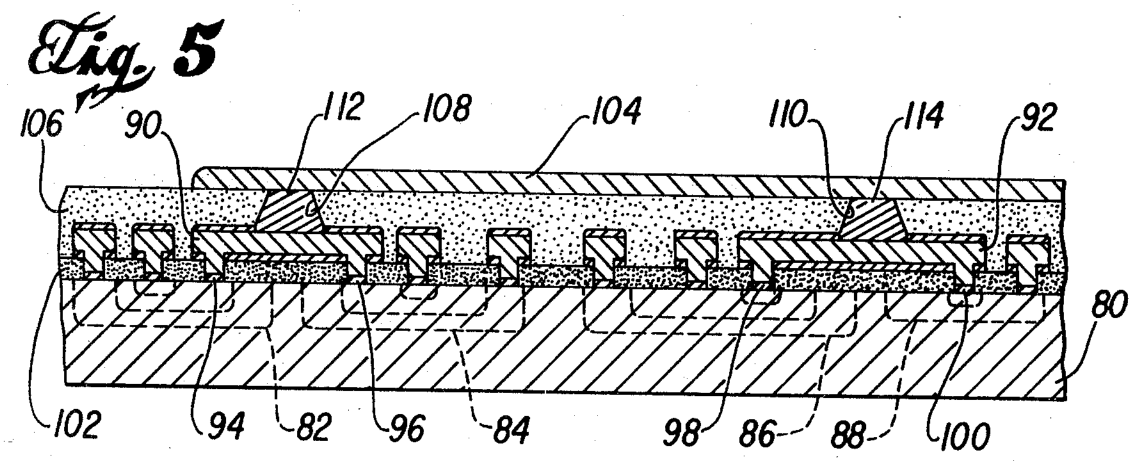
FIG. 5 is a cross-sectional view of another embodiment of the invention.

Another specific embodiment of the invention is shown in FIG. 5. In FIG. 5, substrate 80 has formed thereon discrete components 82, 84, 86, and 88. For simple illustration, components 82, 84 and 86 are shown as transistors and component 88 is shown as a diode. Ordinarily, however, there are many discrete components which are connected in one or more circuits via terminal pads such as illustrated in FIG. 3. The method of this invention is not limited to connecting terminal pads, however, since any other selected region may be afforded an electrical connection through an overlying insulating layer by employing the method of this invention. In any event the selected regions are interconnected with other selected regions to effect the desired unitary circuit function. These integrated circuits or arrays thereof, and multilevel interconnections are well known and need not be described in detail herein. For example, copending application Ser. No. 606,064, "Ohmic Contact and Multilevel Interconnection System for Integrated Circuits," by James A. Cunningham and Robert S. Clark and assigned to the same assignee as the present application, contains a detailed illustration and description of an interconnection pattern in which 16 integrated circuits of a more complex circuit array are interconnected, requiring a second level of electrical conductor interconnection.

Selected regions of the components 82, 84, 86, and 88 are interconnected by first layer metal conductors, illustrated generically by conductors 90 and 92. As illustrated, first level conductors 90 and 92 are comprised of first layers 94, 96, 98 and 100 of molybdenum onto which conductors 90 and 92 of gold are deposited. This is done to effect better and more permanent connection between the molybdenum and the semiconductor material; which may be, for example, silicon, germanium, or gallium arsenide.

Ordinarily, these first layer metal conductors are formed by a first layer of metallization through apertures in an insulating layer 102 atop the substrate. Conventional photolithographic techniques are employed to form the apertures in the insulating layer 102. Furthermore, after the first layer of metallization is deposited, conventional photolithographic techniques are employed to effect only desired interconnections and to etch away selectively metal effecting undesired interconnections.

A second layer of metal conductors 104 is interconnected through a second insulating layer 106 via apertures 108 and 110 with the first layer metal conductors 90 and 92. In order to effect good electrical interconnection between the first layer metal conductor and the second layer metal conductors, apertures 108 and 110 have metal conductors 112 and 114 electrolessly deposited therein until the apertures are substantially filled. In this way electrical continuity is insured regardless of the configuration of the sidewalls of apertures 108 and 110, illustrated to be bell-shaped as frequently occurs when they are etched through the second insulating layer 106. A structure such as illustrated in FIG. 5 and prepared by the method of the invention insures electrical continuity between the layers of metal conductors; and substantially increases the number of multilevel integrated circuit arrays which will meet sales specifications.

Preparation and Process Details

Figure 6:
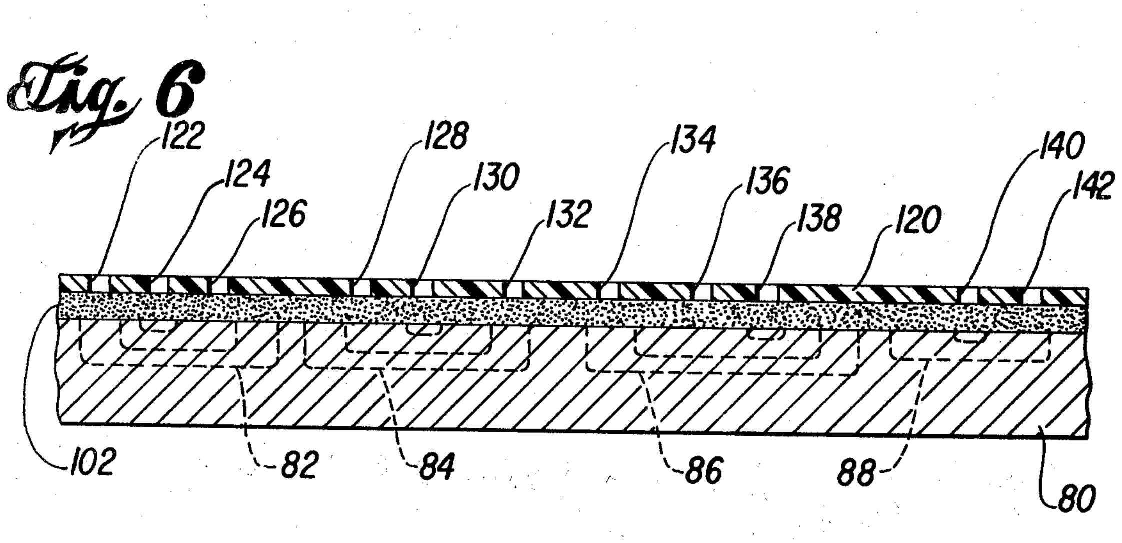
FIGS. 6—9 are cross-sectional views of a portion of an integrated circuit showing steps, employing the invention, in which discrete components are formed in a substrate and appropriately interconnected by multilevel metal conductors to form an embodiment similar to that illustrated in FIG. 5. DESCRIPTION OF SPECIFIC EMBODIMENTS In the following descriptive matter, the first portion pertaining to FIGS. 1—4 emphasizes the invention; whereas the portion pertaining to the remaining FIGURES contain details for complete understanding thereof.
Figure 7:
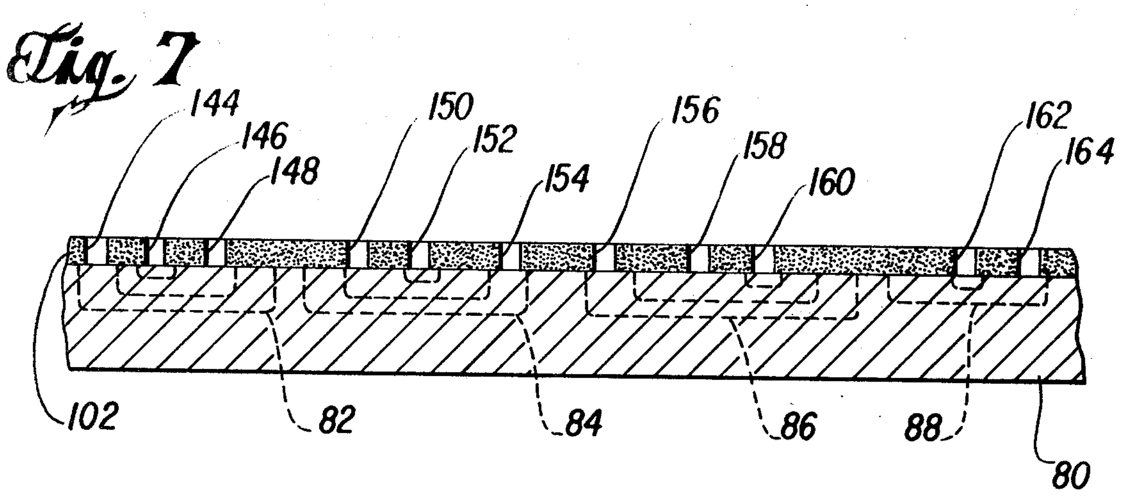

A multilevel integrated circuit array similar to that illustrated in FIG. 5 may be prepared as follows. The discrete components 82, 84, 86 and 88 are formed on substrate 80 by one or more of the conventional techniques such as diffusion, epitaxial deposition, or sputtering. A first insulating layer 102 (FIG. 6) is formed thereover. The insulating layer is ordinarily silicon oxide although other materials such as silicon nitride, aluminum oxide or tantalum oxide may be employed. At least part of the interconnection between the components is formed by first layer metal conductors through apertures in this first insulating layer. The apertures are formed by conventional photolithographic techniques. In these photolithographic techniques a photoresist mask 120 having the desired patterning is emplaced on insulating layer 102 and the apertures etched away at apertures in the mask. For example, a photoresist such as Kodak's KMER is deposited on the first insulating layer 102 and a portion thereof exposed to light. The portion which is exposed to light undergoes a polymerization while the unexposed portion does not. Upon subsequent treatment with a developer solvent such as trichloroethylene, the unexposed portion is washed away whereas the exposed portion is developed, forming the photoresist mask 120. For example, mask apertures 122, 124, 126, 128, 130, 132, 134, 136, 138, 140 and 142 which had not been exposed to light, are dissolved and washed away by the developer-solvent, exposing the insulating layer. The exposed insulating layer is then subjected to an etch solution such as a solution of hydrofluoric acid. The etch solution forms apertures 144, 146, 148, 150, 152, 154, 156, 158, 160, 162 and 164, FIG. 7, through the first insulating layer 102 to selected regions of the components therebeneath. The photoresist mask is removed.

Next a first layer metallization is laid down. The metal conductor employed in the metallization is deposited by conventional techniques such as RF sputtering or vacuum evaporation techniques. It is deposited over the entire insulating layer 102, as well as into the apertures therethrough and to selected regions of the components therebeneath. Any of the conventionally employed metals may be deposited as the first layer metal conductor in this first metallization. For example, molybdenum may be employed. Other metals such as copper, silver, gold, titanium, tantalum or even aluminum can be employed in combinations that may also include the molybdenum to effect a metallization layer that will adhere, to satisfactory degrees, to the semiconductor material, to the insulating layer, and to the subsequently deposited metal. Ordinarily, aluminum is not employed because special techniques are required for effective subsequent bonding, or adhesion, with other metals electrolessly deposited thereon. Where gold is to be employed as the second level metal conductor, or for the metallic interconnection through apertures in the second insulating layer as described hereinafter, molybdenum is an excellent first level metallization material.

In the preferred embodiment of the invention, the metallization layer is comprised of a series of at least two of the above metals, such as molybdenum and gold. The deposition of molybdenum and gold is described in detail in U.S. Pat. No. 3,290,570, "Multilevel Expanded Metallic Contact for Semiconductor Device," James A. Cunningham and Robert P. Williams. Furthermore, the combination of molybdenum in the first layers followed by gold in the last layer, or of both molybdenum and gold in each respective layer and the details of each respective combination are described in the patent application Ser. No. 606,064 noted hereinbefore. Briefly, the process for the latter and preferred combination is as follows. A first, very thin, layer of molybdenum is usually deposited. Next, a layer of gold is deposited as a second portion of the first level metallization. A conventional photolithographic mask is emplaced and the excess gold and molybdenum are etched away from areas not covered by the mask by conventional etching solutions. For example, the gold may be etched away by cyanide solution at about 70° C. for about 15—45 seconds. A suitable cyanide etch solution is an aqueous solution of 60 grams per liter of Metex Aurostrip supplied by McDermid Incorporated of Waterbury, Connecticut. The slices are rinsed in water after the cyanide etch to prevent the evolution of toxic gas in subsequent processing. The gold etchant must operate in a relatively slow, controlled manner so that the slices can be removed from the solution as nearly as possible to the exact time when the undesired gold has been removed but before undercutting of the gold occurs to any appreciable extent. The most common gold etchant, aqua regia, is not suitable since it is detrimental to the photoresist material. After the gold etching step, the excess molybdenum is removed by an etchant which likewise operates in a slow, controlled manner and which does not tend to oxidize molybdenum. A phosphoric acid solution is excellent for this purpose and may comprise 70 parts phosphoric acid, 15 parts acetic acid, 3 parts nitric acid, and 5 parts deionized water, the parts denoting parts by volume standard reagent grade chemicals. The phosphoric acid in this solution quickly removes any molybdenum oxide already in place or formed during the etching bath so that the entire etching time is occupied with removal of molybdenum, not molybdenum oxide. Thus, a time may be selected which coincides as nearly as possible with complete removal of the molybdenum coating, no leeway being needed for the variable of molybdenum oxide removal. At a temperature of 50° C., removal of the molybdenum coating is effected in about 20 seconds with this phosphoric acid solution. The photoresist mask which has remained intact through these two etching steps, is now removed; for example, by scrubbing in a solvent such as methylene chloride.

Where a second insulating layer is to be employed and its bonding to the first layer metal conductor is desired, a thin layer of molybdenum may be deposited on top of the gold before the masking and etching steps are carried out.

Various modifications of the above described embodiment may be used. For example, it may be desirable to perform very shallow diffusions of impurities at the points of contact between the molybdenum film (films) and the semiconductor surface to provide low resistivity ohmic contacts at these points. In addition, instead of depositing the molybdenum film directly upon the semiconductor surface, regions or zones of metallic material may be deposited intermediate the silicon surface and the molybdenum film. These metallic regions may be, for example, platinum-silicide deposits formed in the contact areas prior to the deposition of the molybdenum film, or a flash or very thin layer of aluminum applied prior to the deposition of the molybdenum film. Further, it is to be understood that throughout the above description the use of the metals molybdenum and gold are to include not only pure molybdenum and gold layers, but also molybdenum and gold layers that may have a minor percentage of impurities added thereto. For example, trace impurities may be added to the molybdenum film to increase its adherence and the gold films may have a minor percentage of platinum added thereto to increase the adhesion of the gold to the molybdenum.

Figure 8:
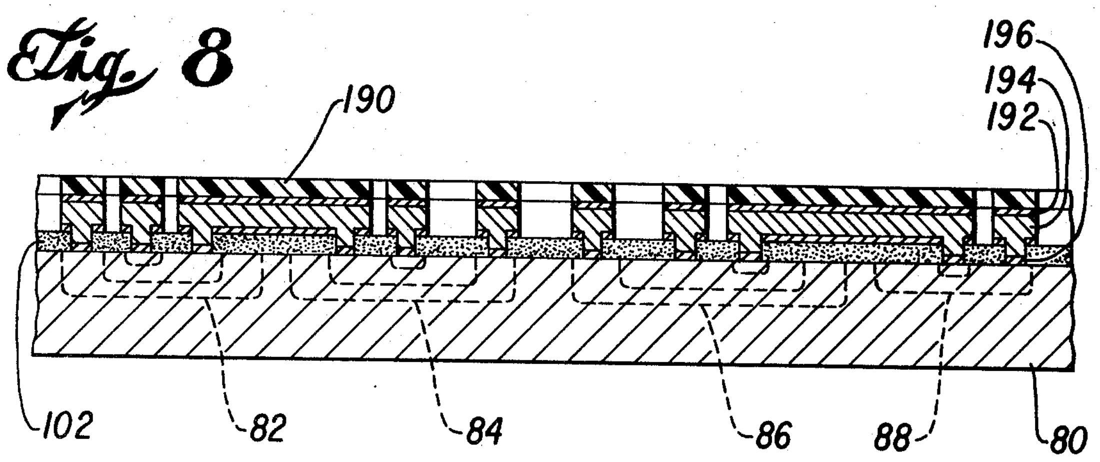
Figure 9:
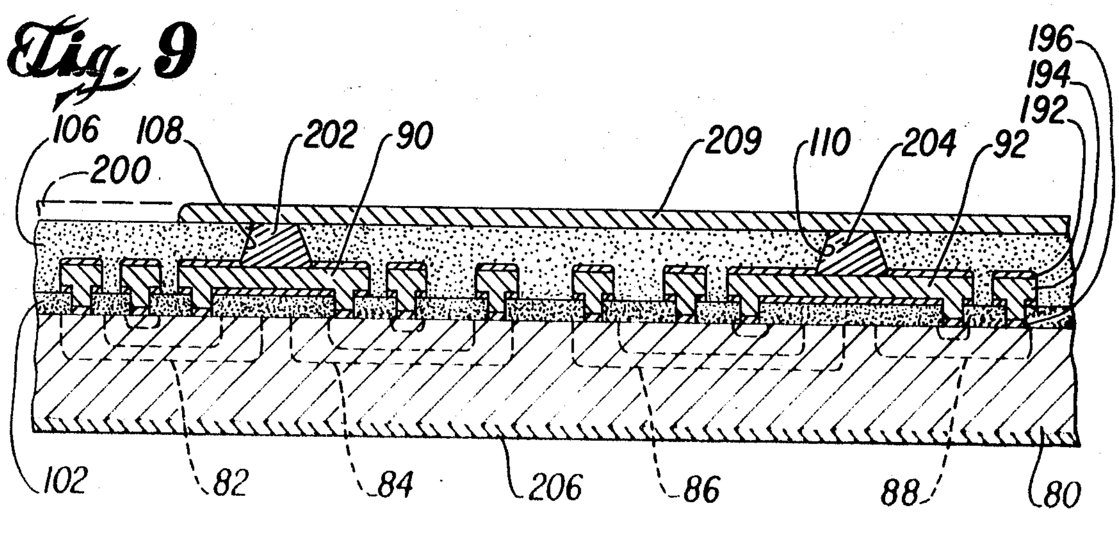

A cross-sectional view of the portion of the device being manufactured in accordance with the invention is shown at this point in FIG. 8. Therein photolithographic mask 190 is emplaced, as described hereinbefore, atop the layer of molybdenum 192 which remains atop the layer of gold 194 deposited atop the layer of molybdenum 196 through the apertures the insulating layer 102. The photoresist mask 190 is removed and a second insulating layer 106 (FIG. 9) is formed over the entire slice and first layer of metal conductors. In this way, the molybdenum bonds well to the semiconductor material forming the components on the substrate; the gold bonds well to the molybdenum to form good first layer metal conductors; and the subsequently deposited layer 192 of molybdenum bonds to the gold and to the second insulating layer 106. Consequently, a much superior device is effected.

Next, apertures 108 and 110 are formed through the second insulating layer 106 to the respective first layer metal conductors 90 and 92. Again, conventional photolithographic techniques and etch solutions are employed to etch away the insulating layer, and the molybdenum from atop the gold contacts 90 and 92 in the region of apertures 108 and 110.

Metal is electrolessly deposited through apertures 108 and 110 to first layer metal conductors therebeneath. Any of the metals which bond well to the metals employed as the first layer metal conductors may be deposited in apertures 108 and 110. For example, the above-named metals, including nickel, copper, molybdenum, silver or gold, may be employed and electrolessly deposited in apertures 108 and 110 from an electroless plating solution, as electroless depositing solutions are often called.

The entire slice is immersed in an electroless plating solution of the metal which is to be deposited in the apertures 108 and 110 and atop the first layer of metal conductors 90 and 92. Any of the electroless plating solutions effecting deposition of the metal to be deposited in the aperture can be employed. Electroless plating solutions, are available from most major suppliers in accordance with the metal to be deposited. For example, when nickel is to be deposited in apertures 108 and 110 as the metal conductor, a solution of ammoniacal nickel hypophosphite may be employed. It is prepared in accordance with the instructions from the distributor, Englehard Industries, East Newark, New Jersey. As a further example, if gold is to be deposited in apertures 108 through 110, Atomix gold solution, also available from Englehard, may be employed.

After the entire slice is placed into the electroless plating solution, the temperature of the solution is increased to the temperature at which the metal is deposited. For the example in which nickel is to be deposited in the apertures, the slice is placed in ammoniacal nickel hypophosphite solution and heated to about 90° C. to effect deposition of the nickel in apertures 108 and 110. The metal forms a continuous film 200 (FIG. 9) following the contour of the topography of the second insulating layer, and, importantly, deposits regions 202 and 204, respectively, in apertures 108 and 110. Regions 202 and 204 conform to the configuration of the apertures even when deposition is stopped short of filling the apertures. It is preferred to substantially fill the apertures, however, as illustrated in FIG. 5. Ordinarily, film 200 will not bond to the second insulating layer 106 and is removed therefrom when the slice is removed from the solution. A layer 206 of metal may be formed on the bottom of substrate 10 during the electroless deposition. Layer 206 bonds to the substrate, but can be removed, if desired, during subsequent etching and cleaning operations. The metal electrolessly deposited as regions 202 and 204 bonds securely to the first layer of metal conductors and effects good electrical connection therewith.

It has been found advantageous to pretreat the first layer of metal contacts with an aqueous metal halide solution to effect improved metal bonding. Specifically, when gold is employed, palladium chloride solution is preferably used to pretreat, or prewash the gold before bonding. It is theorized, by way of explanation only, that a monolayer or so of palladium molecules serve as activation sites for the electroless deposition of gold thereafter.

The second level metallization, also, may be carried out by any conventional technique to form the second layer metal conductors conforming to the surface as did film 200, but adhering thereto. Ordinarily, low-temperature vacuum evaporation is employed to form the second metallization film. The second layer metal conductors are then formed by selective removal of metal in areas where it is undesired. Conventional photolithographic techniques are employed in the selective removal of metal to form the desired second layer metal conductors 209.

Third and subsequent layers of metallization can be employed to form third and subsequent layer metal conductors with third and subsequent intermediate insulating layers having apertures to afford the desired interconnections between layers in more complex circuits. We have been able to fabricate our circuits to date with no more than three levels of metal conductors separated by insulating layers therebetween. It is easy to foresee, however, that with increasing complexity of integrated circuits, more layers may become advisable. The method of the invention may be employed regardless of the number of layers.

Having thus described the invention it will be understood that such description has been given by way of illustration and example and not by way of limitation. For the latter purpose reference should be added to the appended claims which define the scope of the invention.

We claim:

1. A method of fabricating a multilevel semiconductor device comprising the steps of:

a. forming a plurality of components having regions thereof in a semiconductor body;
b. forming a first insulating layer having a first plurality of apertures therein over selected regions of said components;
c. forming a first level of metal conductors over said first insulating layer extending through said first apertures to interconnect appropriate regions of said components;
d. forming a second insulating layer over said first level of metal conductors;
e. forming a second plurality of apertures extending through both said first and second insulating layers to expose other selected regions on said components;
f. immersing said semiconductor body in a solution containing a metallic salt;
g. chemically reducing said salt from said solution and forming a metal conductor to substantially fill said second plurality of apertures and effect ohmic connection with said deposited metal over said other selected regions; and
h. providing a second level of metal conductors selectively connecting said conductors formed by reducing said salt.

2. A method of fabricating a multilevel integrated circuit array comprising the steps of:

a. forming first and second semiconductor integrated circuits in a substrate, said integrated circuits having a first level of metal terminal pads connected to selected regions of components thereof;
b. forming an insulating layer over said integrated circuits and substrate with apertures exposing selected ones of said metal terminal pads of said first and of said second integrated circuits;
c. immersing said substrate in a metallic salt solution;
d. chemically reducing said salt and forming a metal conductor to substantially fill said apertures and effect ohmic connection with said exposed selected metal terminal pads; and
e. forming a second level of metal conductors selectively interconnecting said conductors formed by reducing said salt.

3. The method of claim 2 wherein said first level of metal terminal pads are activated by treatment with a metallic halide solution prior to the said chemically reduced salt-formed metal conductor making ohmic connection therewith.

4. The method of claim 3 wherein said first level of metal terminal pads is comprised of gold which is activated by treatment with an aqueous palladium chloride solution.

5. The method of claim 2 wherein said first level of metal terminal pads is provided by depositing at least two metals of either molybdenum, gold, silver or copper.

6. The method of claim 5 wherein molybdenum and gold are both employed in providing said first level of metal terminal pads.

UNITED STATES PATENT OFFICE

CERTIFICATE OF CORRECTION

Patent No. 3,597,834 Dated August 10, 1971

Inventor(s) Jay W. Lathrop et al.

It is certified that error appears in the above-identified patent and that said Letters Patent are hereby corrected as shown below:

On the cover sheet [72] insert -- James A. Cunningham, Dallas --.

Signed and sealed this 25th day of July 1972.

(SEAL)
Attest:

EDWARD M.FLETCHER,JR.
Attesting Officer

ROBERT GOTTSCHALK
Commissioner of Patents